United States Patent [19]

Foulkes et al.

[11] 4,302,629
[45] Nov. 24, 1981

[54] DIGITAL DATA TRANSMISSION SYSTEM

[75] Inventors: John D. Foulkes, Kirkland; David K. Worthington, Bellevue, both of Wash.; John E. Trombly, Winchester, Mass.

[73] Assignee: Teltone Corporation, Kirkland, Wash.

[21] Appl. No.: 62,720

[22] Filed: Aug. 1, 1979

Related U.S. Application Data

[63] Continuation-in-part of Ser. No. 20,252, Mar. 14, 1979.

[51] Int. Cl.³ ............................................. H04M 11/00
[52] U.S. Cl. ................................................... 179/2 DP
[58] Field of Search ................. 179/2 DP, 2.51, 16 F, 179/170 R; 370/26, 75, 97

[56] References Cited

U.S. PATENT DOCUMENTS 3,103,556  9/1963  Nicholls et al. ..................... 370/13
3,832,637  8/1974  Alexander et al. ............... 179/2 DP Primary Examiner—Joseph A. Popek
Attorney, Agent, or Firm—Christensen, O'Connor, Johnson & Kindness

[57] ABSTRACT

Simultaneous conventional telephone signaling and audio communication, plus digital data transmission, on nonloaded telephone wires is disclosed. Modems (21) connect a telephone (23) and a digital data terminal (25) to one end of the telephone wires. A data transmitter (59) in each modem (21) converts digital data from binary to FSK form and a receiver (57) converts digital data from FSK to binary form. Each transmitter includes a frequency synthesizer that produces one of two FSK signals (F1, F2) depending upon the binary nature (0 or 1) of a particular data bit; and, the receivers include frequency detectors that detect two other FSK signals (F3, F4) and produce a corresponding binary data bit (0 or 1). Voice filters (51) prevent the FSK data signals from reaching the telephones and spurious telephone high frequency signals from reaching the telephone wires. A CO or PABX subsystem (37) is connected to the other end of the telephone wires and includes modems comprising receivers (97) that convert the F1/F2 FSK signals into binary digital data. The binary digital data from the telephone stations is multiplexed and forwarded to a data processing center (15). The CO and PABX subsystem also de-multiplexes multiplexed binary digital data produced by the data processing center and includes transmitters (99) that convert the de-multiplexed data into F3/F4 FSK signals and forward the F3/F4 FSK signals to the related station. Voice frequency filters (91) prevents the FSK signals from reaching the CO or PABX line switching equipment and prevents high frequency noise signals generated by the CO or PABX from reaching the telephone wires.

17 Claims, 3 Drawing Figures

DIGITAL DATA TRANSMISSION SYSTEM

CROSS-REFERENCE TO RELATED APPLICATION

This application is a continuation-in-part of United States Patent Application Ser. No. 020,252, filed Mar. 14, 1979 and entitled "Audio and Full Duplex Digital Data Carrier System." As required for an understanding of the present invention, the information contained in this application is incorporated herein by reference.

TECHNICAL FIELD

This invention relates to communication systems and, more particularly, to wired communication systems adapted to carry digital data signals.

BACKGROUND OF THE INVENTION

Located in various offices of many businesses are data terminals connected to a common data processing center. The offices may be in the same building, several adjoining buildings or scattered throughout a metropolitan area. In the past this arrangement has had a number of disadvantages when data terminals are moved or added.

Turning first to the situation where the data terminals and the data processing center are located near one another, i.e., in the same building or adjoining buildings; each time a data terminal is moved or added, either new wires for connecting the data terminal to the data processing center must be run or existing wires moved. Both running new wires and moving wires are time consuming (and, therefore, expensive) tasks. Moreover, running new wires and moving wires are often disruptive, because offices other than the ones directly associated with the new or moved data terminal are often disturbed as wires are strung or moved in ceiling, wall and other passageways.

Not only is the running of new wires and the moving of old wires disruptive of other offices, it may also delay the use of vacant offices where the data terminal(s) are to be located. That is, the time required to wire or rewire vacant space to accommodate data terminals must be included in the timing of a move into the space. As with other factors affecting a move, the availability of personnel, material etc., can create time delays even if the wiring or rewiring is scheduled to coincide with other changes. Such delays can contribute to delays in the occupancy of the vacant space. Consequently, there is demand for a data transmission system that allows the data terminals of a data processing system to be readily added or moved without requiring the running of new, or the moving of existing, wires used to connect the data terminals to the data processing center.

Turning next to the situation where the data terminals are separated from the data processing center by a substantial distance; such a situation may exist where a number of branch offices all associated with a central or "home" office. Such a situation exists in many commercial environments, e.g., banking real estate, etc. In such instances, the branch offices and the central or home office include data terminals connected to a data processing center located at one of the offices, which is usually the central or home office, but may be one of the branch offices or even an entirely separate office. In any event, as branch offices are opened and closed for various reasons data terminals must be moved. Further, the location of data terminals in the various offices is sometimes changed. This situation is somewhat different than the foregoing situation where the data terminals are located relatively near to the data processing center. Specifically, in the situation where the data terminals are separated from the data processing center, the terminals are usually connected to the center via telephone wires. As a result, when data terminals are to be added or moved, the owner or lessee of the data terminal is not required to add or move wires. On the other hand a related problem does exist in this situation. Specifically, when data terminals requiring dedicated (to the terminal) telephone wires are added or moved, the telephone company (TEL CO) must change the telephone service. This may simply require connecting up existing unused wires, or adding new wires. In either situation, the owner or lessee of the data terminal must pay for the additional or changed service. The use of dedicated telephone wires has a further disadvantage. Specifically, telephone wires dedicated to data terminals cannot be used for audio communications. As a result, separate data and audio communication wires are required for each office location requiring a data terminal. Since each pair of telephone wires is leased, the users costs are increased. (A somewhat similar situation exists where the data terminals are connected to telephone wires via a coupler, as required, rather than using dedicated telephone wires because of the additional telephone capacity required when the data terminal is using the telephone wires.)

Many businesses that have a data processing system wherein a plurality of data terminals are located in the vicinity of the data processing center have a private automatic branch exchange (PABX) telephone system. As with a TELCO central office (CO), the PABX routes telephone conversations from, to and between the business's telephone stations. Usually the telephone stations are widely scattered throughout the various offices of the business so as to be readily available to the business's employees. Consequently, usually a telephone station is located in the vicinity of each data terminal.

In view of the foregoing discussion, it will be apparent that the present method of transmitting data between data terminals and a data processing center has a number of disadvantages. The nature of the disadvantages varies in accordance with the distance separating the data terminals from the data processing center. It will also be apparent that telephone stations are usually located in the vicinity of data terminals. However, in the past the use of such telephone stations to transmit digital data has been limited due to the high costs involved in such utilization. The invention is directed to economically utilizing this available transmission medium.

Thus, it is an object of this invention to provide a new and improved digital data transmission system.

It is another object of this invention to provide a digital data transmission system suitable for transmitting digital data over telephone wires without interfering with the simultaneous use of the same wires to carry base band telephone signals.

It is a further object of this invention to provide a transmission system for transmitting digital data from data terminals to a data processing center on telephone wires without impairing the use of the telephone wires to simultaneously carry baseband telephone signals.

SUMMARY OF THE INVENTION

In accordance with this invention, a transmission system for transmitting digital data between data terminals and a data processing center on nonloaded telephone wires without impairing the use of the telephone wires to simultaneously carry baseband telephone signals is provided. That is, the invention provides for simultaneous conventional telephone signaling and audio communication, plus digital data transmission between data terminals and a data processing center. The invention is useful when the data terminals and the data processing center are located relatively near one another, i.e., in the same building or in adjacent buildings. The invention is also useful when the data terminals are remote from the data processing center. In either case, the telephone wires carrying the digital data, and the baseband signals, must be nonloaded. That is, the wires carrying the digital data and the baseband signals running to either a PABX or a CO, as the case may be, must form nonloaded loops, which means that no loading coils (i.e., inductances) are connected to the wires.

The invention includes a station modem located adjacent a telephone located near to a data terminal. The station modems are connected to the telephone and to the data terminal. Each station modem includes a data transmitter that converts digital data to be transmitted from binary form into frequency shift keying (FSK) form for transmission and a receiver for converting received digital data from FSK form into binary form. More specifically, the transmitters include a frequency synthesizer that produces one or the other of two FSK signals (F1 and F2) depending upon the binary nature (0 or 1) of a particular data bit to be transmitted; and, the receivers include frequency detectors that detect two other FSK signals (F3 and F4) and, depending upon the frequency of the detected signal, produce a corresponding binary data bit (0 or 1). The station modems also include voice filters that prevent the FSK data signals from reaching the associated station telephones and prevent any spurious high frequency signal generated by the telephone from reaching the nonloaded telephone wires. The invention also includes a CO or PABX subsystem located at the central office (CO) or private automatic branch exchange (PABX), as the case may be, connected to the other end of the station telephone wires. The CO or PABX subsystem includes a receiver that converts the F1/F2 FSK signals produced by the station transmitter into binary digital data. A multiplexer/demultiplexer multiplexes the data from several stations and forwards the data to the data processing center. The multiplexer/demultiplexer also demultiplexes multiplexed binary digital data produced by the data processing center; and the PABX or CO modems include transmitters that convert the demultiplexed binary data into F3/F4 FSK signals and forward the F3/F4 FSK signals to the related station modem. Further, the CO or PABX subsystem includes voice frequency filters that connect the main distribution frame telephone lines to the CO or PABX line switching equipment in a manner that prevents the FSK signals from reaching that equipment and prevents high frequency noise signals generated by the CO or PABX from reaching the nonloaded telephone wires.

It will be appreciated that the invention overcomes the foregoing disadvantages of present systems for connecting data terminals to data processing centers. Specifically, rather than running or rerunning wires, or adding or changing TELCO service, when a new data terminal is to be connected to the data processing center, or the location of a present data terminal is to be changed, the invention merely requires that the new location include a telephone located near the new data terminal. In most instances the telephone will already exist; or, provision will have been made to install a telephone. The only requirement is that the telephone be connected to the CO or PABX, as the case may be, by nonloaded wires. The modems used by the invention allow digital data to be transmitted and received without impairing the normal operation of the telephone. That is, the telephone can be utilized to transmit and receive baseband telephone signals simultaneously with the transmission and reception of the FSK digital data signals all on the same pair of unloaded wires.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
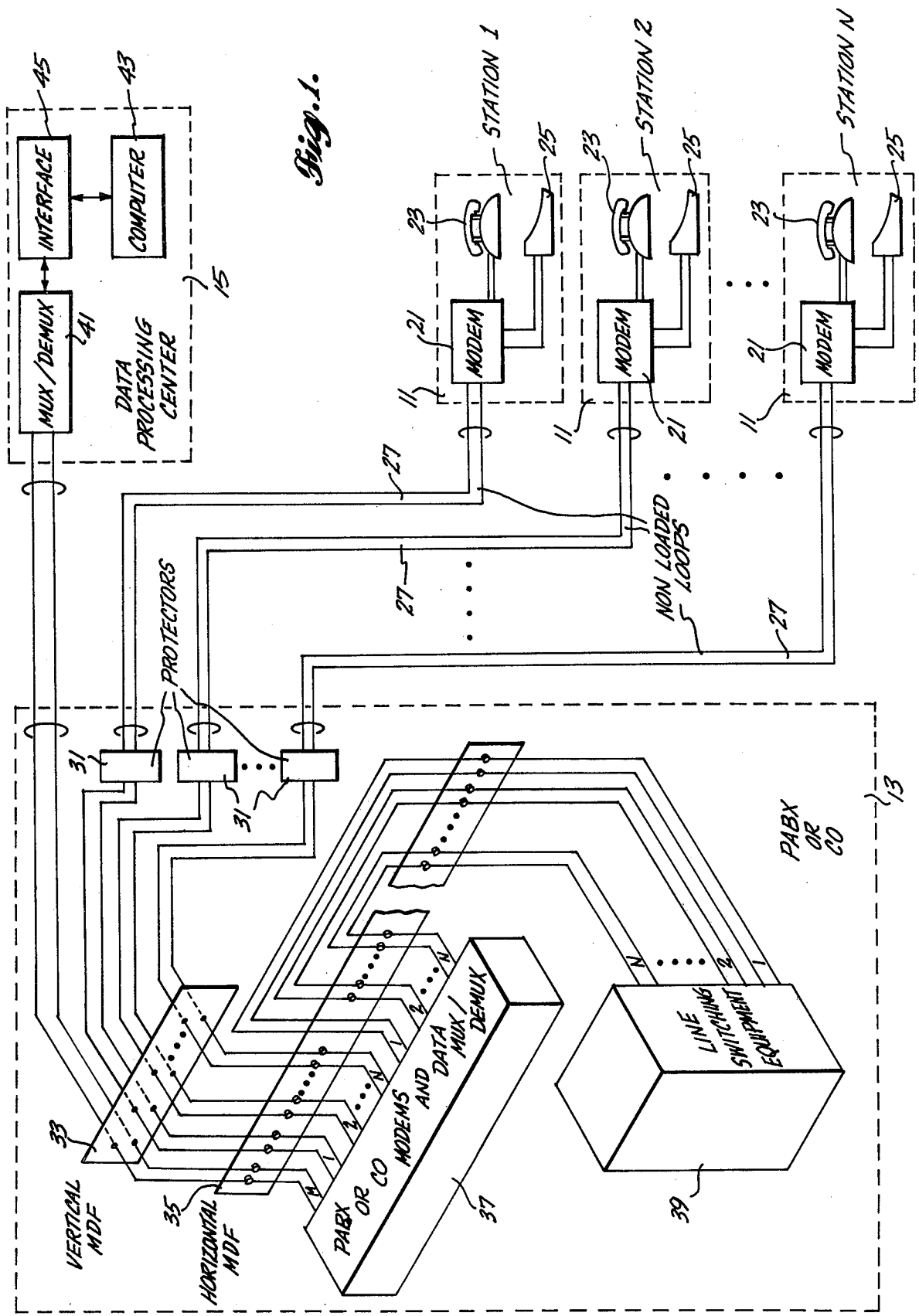
FIG. 1 is a partially block and partially pictorial view illustrating a digital data transmission system formed in accordance with the invention.

FIG. 1 is a partially block and partially pictorial diagram of a digital data transmission system formed in accordance with the invention. Included in FIG. 1 are a plurality of telephone stations 11 denoted Station 1, Station 2, . . . Station N; a private automatic branch exchange (PABX) or central office (CO) of a telephone company (TELCO) 13; and, a data processing center 15. Each station 11 includes a modem 21; a telephone 23; and, a data terminal 25. The telephone 23 and the data terminal 25 of the stations are connected to their respective modems 21. The modems, in turn, are connected to the station ends of nonloaded loops 27, which run to protectors 31 forming part of the PABX or CO 13. The protectors 31, in turn, are connected through the vertical main distribution frame (MDF) 33 in a convention manner to the horizontal MDF 35. The terminals of the horizontal MDF 35 are, in turn, connected to a PABX or CO subsystem 37, which includes modems and a data multiplexer/demultiplexer as hereinafter described. In addition to being connected to the PABX or CO end of the wires running to the stations 11, the PABX or CO subsystem 37 is also connected via the horizontal main distribution frame 35 to the line switching equipment 39 of the PABX or CO 13. For purposes of identification, the terminals of the PABX or CO subsystem connected to the stations are correspondingly denoted 1, 2 . . . N. The corresponding terminals of the PABX or CO subsystem connected to the line switching equipment are also denoted 1, 2, . . . N.

In addition to being connected to the stations 11 and the line switching equipment 13, the PABX or CO subsystem 37 is also connected via the horizontal MDF 35 and the vertical MDF 33 to the data processing center 15 via a pair of wires. The terminals of the PABX or CO subsystem connected to the data processing center 15 are denoted M in FIG. 1.

Figure 2:
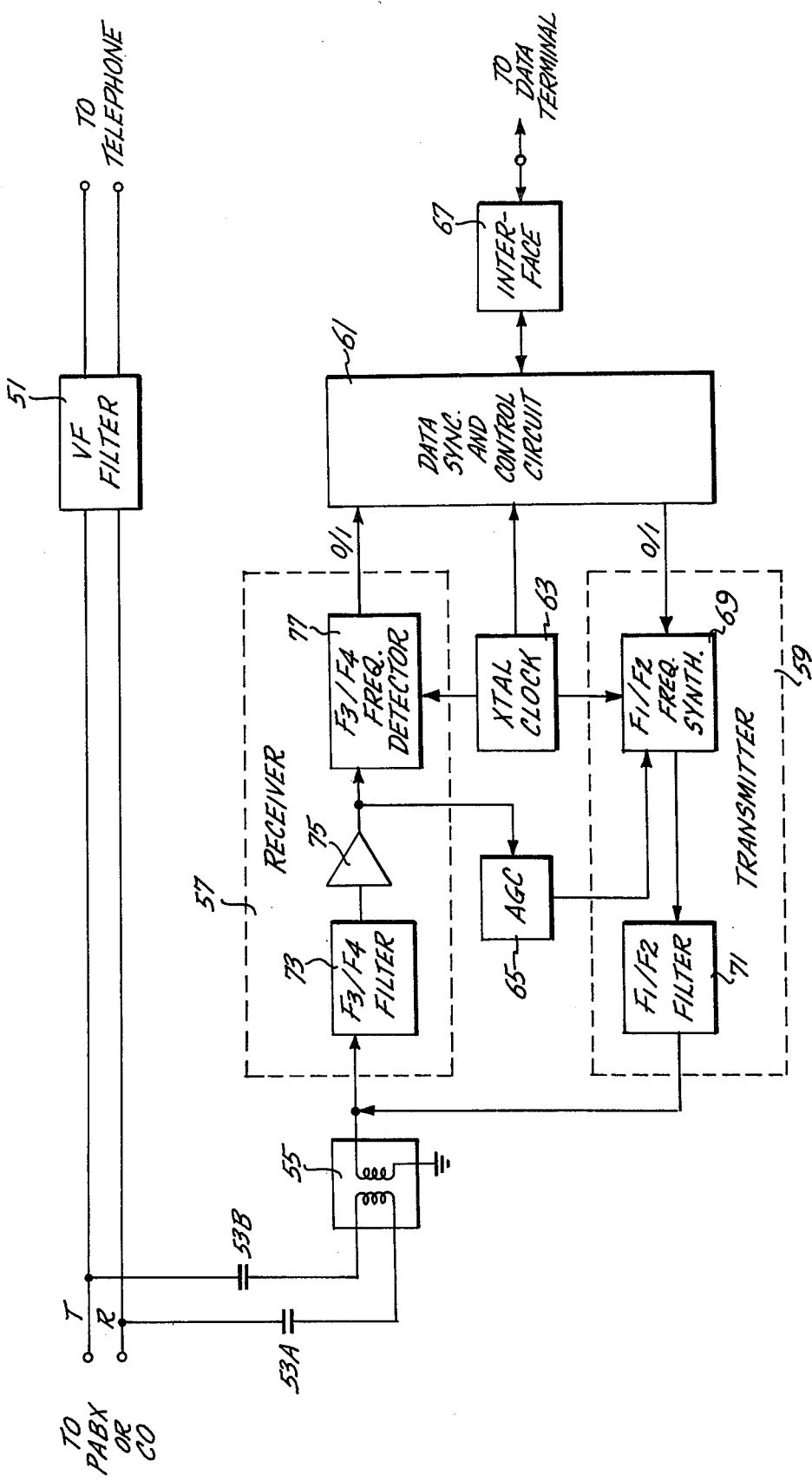
FIG. 2 is a block diagram illustrating a station modem suitable for use in the digital data transmission system illustrated in FIG. 1; and, FIG. 3 is a block diagram illustrating a central office or private automatic branch exchange modem and data multiplexer/demultiplexer subsystem suitable for use in the digital data transmission system illustrated in FIG. 1.
Figure 3:
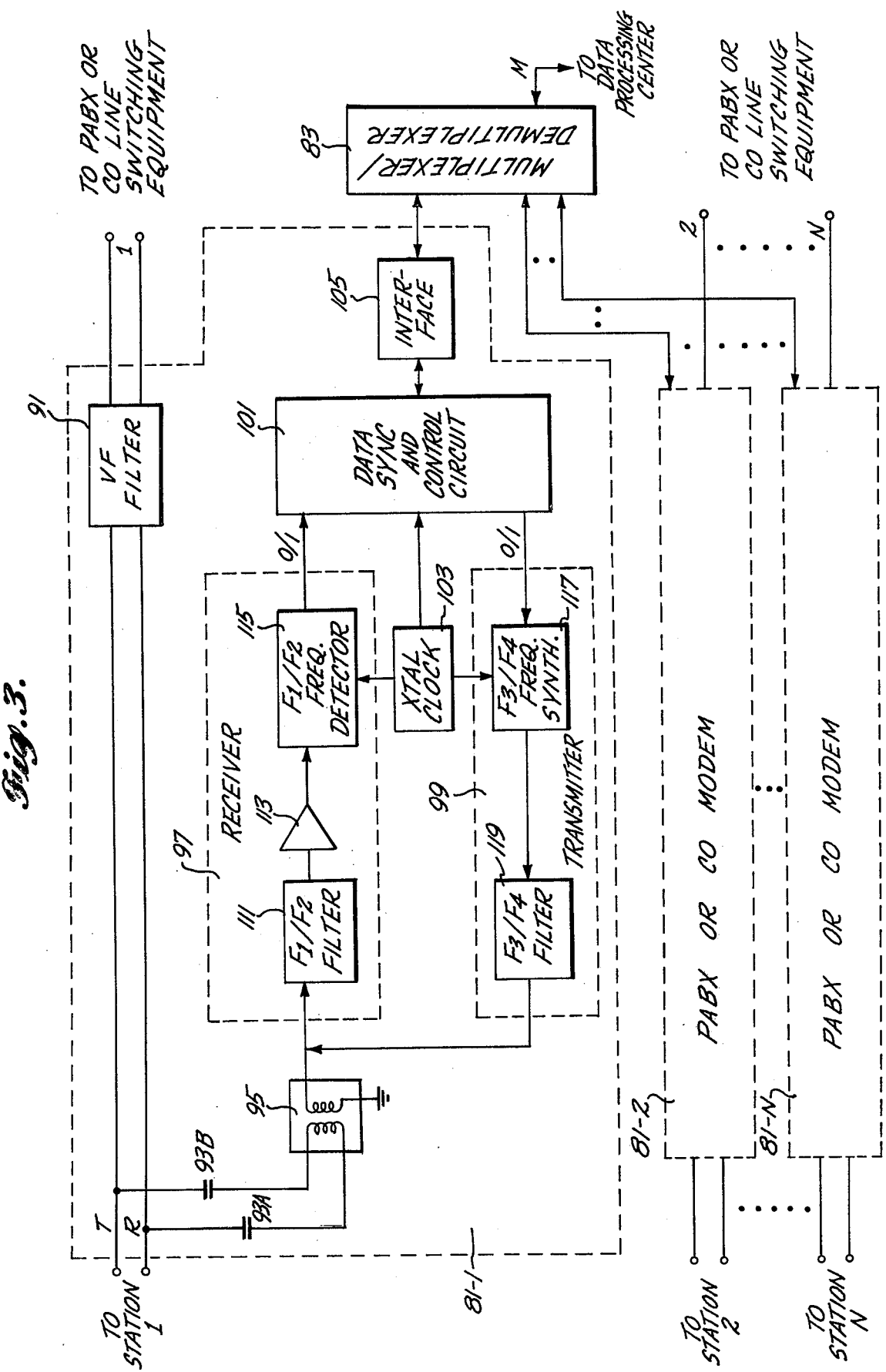

As will be better understood from the following description of FIGS. 2 and 3, the station modems 21 connect the telephones 23 to the related pair of tip and ring telephone wires forming the nonloaded loop through an audio or voice frequency filter, which prevents the transmitted and received digital data signals from being applied to the telephones and prevents spurious high frequency signals generated by the telephone from reaching the nonloaded loops. Further, the modems include transmitters and receivers that transmit one pair of frequency shift keying (FSK) signals and receive another pair. More specifically, when a subscriber's data terminal is transmitting data, the modem converts the data from binary form (i.e., 0 and 1 bit form) into FSK form. The modem transmitters produce a signal at one FSK frequency (F1) for a binary zero and a second FSK frequency (F2) for a binary one. The F1 and F2 FSK signals produced by the station modems are forwarded to the PABX or CO subsystem 37 via the related nonloaded loop 27; and, vertical and horizontal MDFs 33 and 35. The pABX or CO subsystem includes a modem dedicated to each station. The PABX or CO modems reconvert the signals they receive from F1/F2 FSK form into binary form. The data from the PABX modems is multiplexed by a multiplexer/demultiplexer and the multiplexed binary data is transmitted to the data processing center via the horizontal and vertical MDFs and the pair of connecting wires. At the data processing center 15, the received data is demultiplexed by a multiplexer/demultiplexer 41; and, the demultiplexed data is applied to a computer 43 via an interface 45.

When the computer desires to transmit data to a particular data terminal, the binary data produced by the computer is applied through the interface 45 to the multiplexer/demultiplexer 41 of the data processing center 15, where it is multiplexed with data destined for other data terminals. The multiplexed data is transmitted to the PABX or CO subsystem 37 where it is demultiplexed and applied to the related modem of the PABX or CO subsystem. The modems convert the demultiplexed data from binary form into FSK form, but at a different pair of FSK signal frequencies. More specifically the FSK signals produced by the PABX or CO modems are at frequencies F3 (binary zero) and F4 (binary one), which are separated from F1 and F2 by a suitable bandwidth. The FSK signals produced by the PABX or CO modems are transmitted to the station modems via the horizontal MDF 35, the vertical MDF 33 and the related nonloaded loop 27. The station modem reconverts the FSK signals it receives into the related binary signals and forwards the binary signals to the associated data terminal 25.

FIG. 2 is a block diagram of a subscriber modem 21 suitable for use in the digital data transmission system illustrated in FIG. 1 and includes: a voice frequency (VF) filter 51; a pair of coupling capacitors 53A and 53B; a coupling transformer 55; a receiver 57; a transmitter 59; a data sync and control circuit 61; a crystal clock 63; an automatic gain control (AGC) circuit 65; and, an interface 67.

As schematically illustrated in FIG. 2, the station end of the related tip (T) and ring (R) pair of nonloaded telephone wires are connected through the voice frequency filter 51 to the subscribers telephone. The voice frequency filter is bidirectional, i.e., audio or baseband signals can pass to and from the station's telephone. The voice frequency filter prevents FSK signals from being applied to the telephone, provided they are chosen to lie outside (above) the normal voice frequency or audio band. Obviously, the F1, F2, F3 and F4 frequencies chosen to be used in an actual embodiment of the invention must meet this requirement. The voice frequency ffilters also prevent spurious high frequency signals generated by the telephone from reaching the nonloaded telephone wires.

The subscriber end of the related tip and ring pair of telephone wires are also connected via the coupling capacitors 53A and 53B to one side of the coupling transformer 55. The other side of the coupling transformer 55 is connected to the input of the receiver 57 and to the output of the transmitter 59. The output of the receiver 57 is connected to an input of the data sync and control circuit 61. In addition, the data sync and control circuit 61 is connected to the crystal block 63 so as to receive clock pulses. Also, the automatic gain control circuit 65 has its input connected to receiver 57 and its output connected to a control input of the transmitter 59. Finally, the data sync and control circuit 61 is connected through the interface 67 to the station data terminal.

As noted above, the FSK signals transmitted by the transmitter 59 may be denoted F1 and F2. For purposes of discussion, it is assumed that F1 is produced when the data terminal produces a binary zero (0) and F2 is produced when the data terminal produces a binary one (1). The FSK signal is received by the receiver 57, as also noted above, are designated F3 and F4. For purposes of discussion, it is assumed that an F3 signal denotes a binary zero (0) in FSK form and an F4 signal denotes a binary one (1) in FSK form. As noted above, F1, F2, F3 and F4 all lie outside (above) the voice frequency range. Moreover, F1, F2, F3 and F4 have a frequency separation adequate to allow each of these signals to be readily detected in the presence of the others.

As illustrated in FIG. 2, the transmitter 59 includes an F1/F2 frequency synthesizer 69 and an F1/F2 filter 71. The frequency synthesizer receives the 0/1 binary data signals produced by the related data terminal 25 via the interface 67 and the data sync and control circuit 61. In addition, the F1/F2 frequency synthesizer receives clock pulses produced by the crystal clock 63; and, an amplification control signal produced by the automatic gain control (AGC) circuit 65. In accordance therewith, the frequency synthesizer produces the F1 and F2 signals. More specifically, each time a binary zero (0) is produced by the data terminal, the frequency synthesizer produces an F1 signal; and each time a binary one (1) is produced by the data terminal, the frequency synthesizer produces an F2 signal. The output of the F1/F2 frequency synthesizer 61 is connected through the F1/F2 filter 71 to the coupling transformer 55. The F1/F2 filter is a bandpass filter that passes signals in the F1/F2 frequency range and rejects signals at other frequencies. A frequency synthesizer suitable for producing usable F1 and F2 signals in accordance with the receipt of binary zero (0) and one (1) data produced by a data terminal is described in the United States Patent Application Ser. No. 020,252 entitled "AUDIO AND FULL DUPLEX DIGITAL DATA TRANSMISSION SYSTEM," filed, Mar. 14, 1979. As noted above, the instant application is a continuation-in-part of this previously filed application and any information contained in that application required for an understanding of this application is incorporated herein by reference. This information includes the nature and operation of the frequency synthesizer.

The receiver 57 illustrated in FIG. 2 includes: an F3/F4 filter 73; an amplifier 75; and an F3/F4 frequency detector 77. The input of the F3/F4 filter is connected to the receiver side of the coupling transformer 55 and only passes FSK signals in the F3/F4 frequency range. Signals lying outside of this range are rejected by the F3/F4 filter. The output of the F3/F4 filter 73 is connected through the amplifier 75 to the input of the F3/F4 frequency detector 77. The output of the F3/F4 frequency detector, which determines whether or not the incoming signal is an F3 signal or an F4 signal; is connected to the data sync and control circuit 61. More specifically, when the F3/F4 frequency detector detects an F3 signal, it produces a binary zero (0) and when the F3/F4 frequency detector detects an F4 signal it produces a binary one (1). A suitable F3/F4 frequency detector is also described in parent United States Patent Application Ser. No. 020,252, referenced above. As with the F1/F2 frequency synthesizer 61, as required for an understanding of the present application, the information contained in United States Patent Application Ser. No. 020,252 describing the frequency detector disclosed therein is incorporated herein by reference.

In addition to being connected to the input of the F3/F4 frequency detector 77, the output of the amplifier 75 of the receiver 57 is connected to the control input of the automatic gain control (AGC) circuit 65. The output of the AGC circuit 65, as previously noted, is connected to the F1/F2 frequency synthesizer 69. The AGC circuit 65 inversely controls the magnitude of the transmitted signal produced by the F1/F2 frequency synthesizer such that its logarithm is proportional to the negative logarithm of the magnitude of the received signal. As described in more detail in the U.S. Patent Application Ser. No. 020,252, this arrangement compensates for the attenuation differences of different length pairs of tip and ring wires. More specifically, the longer the tip and ring wires connecting the modem of the receiving station to the central office of PABX, the weaker will be the received signal. As a consequence of the negative logarithm AGC control, a weak received signal causes a strong transmitted signal. This arrangement assures that the PABX or CO subsystem 37 will receive modulated data signals from the stations at nearly the same level, regardless of any differences in the distance between the PABX or CO and the station location.

FIG. 3 is a block diagram of a PABX or Co subsystem 37 suitable for use in the embodiment of the invention illustrated in FIG. 1 and comprises: a plurality of PABX or CO modems 81-1, 81-2 ... 81-N; and, a multiplexer/demultiplexer 83. Since the PABX or CO modems are identical, only the PABX or CO modem 81-1 related to Station 1 is illustrated in detail in FIG. 3.

Each of the PABX or CO modems 81-1, 81-2 ... 81-N include: a voice frequency (VF) filter 91; a pair of coupling capacitors 93A and 93B; a coupling transformer 95; a receiver 97; a transmitter 99; a data sync and control circuit 101; a crystal clock 103; and, an interface 105. As illustrated in FIG. 3, the central office end of the tip and ring pair of nonloaded wires running to Station 1, are connected through the VF filter 91 to the PABX or CO line switching equipment. As with the station modems, the voice frequency filter 91 is bidirectional i.e., voice signals can pass to and from the PABX or CO line switching equipment; however, F1, F2, F3 and F4 FSK signals are prevented from being applied to the line switching equipment. Further, high frequency noise signals generated by the PABX or CO are prevented from reaching the nonloaded telephone wires by the VF filter 91.

The central office end of the nonloaded wires running to Station 1 are connected via the coupling capacitors 93A and 93B to one side of the coupling transformer 95. The other side of the coupling transformer 95 is connected to the input of the receiver 97 and to the output of the transmitter 99. The output of the receiver 97 is connected to an input of the data sync and control circuit 101 and the input of the transmitter 99 is connected to an output of the data sync and control circuit 101. In addition, the data sync and control circuit 101 is connected to the crystal clock 103 so as to receive clock pulses. Further, the data sync and control circuit 101 is connected through the interface 105 to the multiplexer/demultiplexer 83. The multiplexer/demultiplexer 83 is connected to the multiplexer/demultiplexer of the data processing center 15 as illustrated in FIG. 1 and previously described.

The receiver 97 includes: an F1/F2 filter 111; an amplifier 113; and, an F1/F2 frequency detector 115. The input of the F1/F2 filter 111 is connected to the receiver side of the coupling transformer 95 and only passes FSK signals in the F1/F2 frequency range. The output of the F1/F2 filter 111 is connected through the amplifier 113 to the input of the F1/F2 frequency detector 115. The output of the F1/F2 frequency detector is connected to the data sync and control circuit 101.

As will be appreciated from the foregoing description, the receiver 97 of the PABX or CO modems are generally similar to the receiver 57 of the station modems, except that the input filter is adapted to pass F1/F2 signals, rather than F3/F4 signals; and, the frequency detector is adapted to detect F1/F2 signals, rather than F3/F4 signals. In any event, as with the frequency detector of the receiver of the station modems, the frequency detector 115 of the receiver 97 of the PABX or CO modems detects the presence of F1 and F2 signals and, in accordance therewith, produces binary zeros and ones, which are applied to the data sync and control circuit 101.

The transmitter 99 of the PABX or CO modems includes an F3/F4 frequency synthesizer 117 and an F3/F4 filter 119. The frequency synthesizer receives the 0/1 binary data signals forwarded by the data sync and control circuit 101 in the manner herein described. In addition, the F3/F4 frequency synthesizer receives clock pulses produced by the crystal clock 103. In accordance therewith, the frequency synthesizer produces F3 and F4 signals. These signals are applied to the F3/F4 filter 119, which is a band pass filter that passes signals in the F3/F4 range and rejects signals at other frequencies. The filtered F3/F4 signals are applied to the coupling transformer 95 and, from there, to the tip and ring pair forming the nonloaed telephone line.

The data sync and control circuit 101 is connected to the multiplexer/demultiplexer 83 via the interface 101. Thus, binary digital data produced by the PABX or CO modems is available for multiplexing by the multiplexer/demultiplexer. Further, the multiplexer/demultiplexer is connected to the data processing center. As a result multiplexed data is sent to the data processing center. In addition data processing center multiplexed data is forwarded to the appropriate PABX or CO modem after demultiplexing by the multiplexer/demultiplexer 83.

Turning now to a more detailed description of the operation of a digital data transmission system formed in accordance with the invention; when the data terminal 25 of a station produces data, its related station modem 21 converts the binary digital data into F1/F2 signals, as previously described. These signals are transmitted via the associated nonloaded loop 27 to the receiver of the related PABX or CO modem. The receiver 97, reconverts the F1/F2 digital data signals into binary digital data form. The binary digital data is synchronized by the data sync and control circuit in accordance with pulses received from the crystal clock 103 in a conventional manner and the synchronized data is forwarded by the interface 105 to the multiplexer/demultiplexer 83. The multiplexer/demultiplexer multiplexes the binary digital data it receives from the various PABX or CO modems and forwards the multiplexed data to the data processing center where it is demultiplexed and applied to the computer via the interface 45 as previously described. When the computer produces binary digital data to be forwarded to the various stations, it is multiplexed by the data processing center multiplexer/demultiplexer 41 and forwarded to the multiplexer/demultiplexer 83 of the PABX or CO subsystem. The multiplexer/demultiplexer of the PABX or CO subsystem, illustrated in FIG. 3, demultiplexes binary digital data received from the data processing center and applies appropriate station data to the related PABX or CO modem via the interface and data sync and control circuit. The transmitters of the PABX or CO modems, in accordance therewith, convert the binary digital data into F3/F4 FSK digital data and forwards the data through the F3/F4 filter to the nonloaded loop running to the related station. As previously described, the F3/F4 signals received by the receiver of the related stations are converted by the F3/F4 frequency detectors 77 into binary zero and one signals. The resultant binary zero and one signals are applied via the data sync and control circuits 61 and the interface 67 of the stations to their respective data terminals. The foregoing sequence of operation can occur simultaneously with transmission of baseband telephone signals over the tip and ring pairs of telephone wires without interference between the two different types of communication signals provided the F1, F2, F3 and F4 signals lie well outside the baseband frequency range.

While a preferred embodiment of the invention has been illustrated and described, it will be appreciated that various changes can be made therein without departing from the spirit and scope of the invention. For example, while preferably, the frequency of F3 and F4 are twice the frequency of F1 and F2, respectively, obviously other frequency relationships can be utilized if desired, as long as the criteria set forth above is met. Further, the higher frequencies (F3 and F4) could be transmitted by the station modems and received by the PABX or CO modems and lower frequencies (F1 and F2) transmitted by the PABX or CO modems and received by the station modems, if desired. Still further, the frequency synthesizers and frequency detectors other than those described in the United States Patent Application Ser. No. 020,252 can be utilized if desired, as long as the requirement set forth in application Ser. No. 020,252 related to the parameters of the F1, F2, F3 and F4 signals is met. Hence, the invention can be practiced otherwise than as specifically described herein.

The embodiments of the invention in which an exclusive property or privilege is claimed are defined as follows:

1. In a transmission system for carrying baseband telephone signals, said transmission system including telephone switching equipment connected to telephones via nonloaded loops, the improvement comprising a digital data transmission system for carrying digial data over said nonloaded loops without interfering with the baseband signals carried by said nonloaded loops, said digital data transmission system comprising:

(A) station modems connected between telephones located in the vicinity of associated data terminals and the telephone end of related nonloaded loops running to said telephone switching equipment, said station modems also connected to said associated data terminal, each of said station modems including:

(1) transmitting means for converting digital data produced by said associated data terminal from binary signal form into FSK signal form such that a binary zero (0) causes said FSK signal to have a first frequency, F1, and a binary one (1) causes said FSK signal to have a second frequency, F2, and applying said F1 and F2 FSK signals to said related nonloaded loop;

(2) receiving means for receiving digital data carried by said related nonloaded loop in FSK signal form at third, F3, and fourth, F4, frequencies and converting said F3 and F4 FSK digital data into binary form such that an FSK signal at said third frequency, F3, causes a binary zero (0) and an FSK signal at said fourth frequency, F4, causes a binary one (1) and applying said binary digital data to said associated data terminal; and, (3) voice filter means for connecting said related nonloaded loop to said telephone so as to prevent said F1, F2, F3 and F4 FSK signals from reaching said telephone; and, (B) a switching equipment subsystem located in the vicinity of said telephone switching equipment and connected to the other ends of said nonloaded loops, said switching equipment subsystem comprising:

(1) modern means connected to the other ends of said nonloaded loops for:

(a) converting said F1 and F2 FSK signals applied to said nonloaded loops by said transmitting means of said station modems from FSK signal form into binary digital data form such that an F1 FSK signal causes a binary zero (0) and an F2 FSK signal causes a binary one (1);

(b) converting binary digital data received from a bidirectional signal forwarding means into FSK signal form such that a binary zero (0) causes said FSK signal to have said third frequency, F3, and a binary one (1) causes said FSK signal to have said fourth frequency, F4, and applying said F3 and F4 FSK signals to said nonloaded loops; and, (c) voice filter means for connecting the other ends of said nonloaded loops to line switching equipment forming part of said telephone switching equipment so as to prevent said F1, F2, F3 and F4 FSK signals from reaching said line switching equipment; and, (2) bidirectional signal forwarding means connected to said modem means for:

(a) receiving the binary digital data produced by said modem means resulting from the conversion of said F1 and F2 FSK signals from FSK signal form into binary digital data form and forwarding said binary digital data to a data processing center; and, (b) receiving binary digital data produced by said data processing center and applying said binary digital data to said modem means for conversion by said modem means from binary digital data form into F3 and F4 FSK signal form.

2. The improvement claimed in claim 1 wherein said transmitting means of said station modems includes a frequency synthesizer for producing said F1 and F2 FSK signals in accordance with the binary form digital data produced by the associated data terminal and wherein said receiving means of said station modems includes a frequency detector for detecting said F3 and F4 FSK signals and converting said F3 and F4 FSK signals into binary form digital data and applying said binary form digital data to said associated data terminal.

3. The improvement claimed in claim 2 including an automatic gain control circuit connected between said receiving means and said transmitting means of said station modems such that the amplitude of the F1 and F2 FSK signals produced by said frequency synthesizers of said transmitting means is controlled by the negative logarithm of the amplitude of the F3 and F4 FSK signals received by said receiving means.

4. The improvement claimed in claim 3 wherein said modem means includes a plurality of subsystem modems, each of said subsystem modems including:
a transmitting means for converting binary digital data received from said bidirectional forwarding means into FSK signal form such that a binary zero (0) causes said FSK signal to have said third frequency, F3, and a binary one (1) causes said FSK signal to have said fourth frequency, F4, and applying said F3 and F4 FSK signals to a related nonloaded loop;
receiving means for receiving said F1 and F2 FSK signals applied to said related nonloaded loop by said transmitting means of a related station modem and converting said F1 and F2 FSK signals into binary digital data form such that an F1 FSK signal causes a binary zero (0) and an F2 FSK signal causes a binary one (1) and applying said binary digital data to said bidirectional forwarding means; and,
a voice filter for connecting the other end of said nonloaded loop to said line switching equipment.

5. The improvement claimed in claim 4 wherein said transmitting means of said subsystem modems includes a frequency synthesizer for producing said F3 and F4 signals in accordance with the binary form digital data received from said bidirectional forwarding means and wherein said receiving means of said subsystem modems includes a frequency detector for detecting said F1 and F2 FSK signals and converting said F1 and F2 FSK signals into binary form digital data and applying said binary form digital data to said bidirectional forwarding means.

6. The improvement claimed in claim 5 wherein said bidirectional forwarding means comprises a multiplexer/demultiplexer for multiplexing the binary digital data produced by said receiving means of said subsystem modems and forwarding said multiplexed binary digital data to said data processing center and for receiving multiplexed binary digital data produced by said data processing center, demultiplexing said binary digital data produced by said data processing center and applying demultiplexed binary digital data to said transmitting means of said subsystem modems.

7. The improvement claimed in claim 1 wherein said modem means includes a plurality of subsystem modems, each of said subsystem modems including:
a transmitting means for converting binary digital data received from said bidirectional forwarding means into FSK signal form such that a binary zero (0) causes said FSK signal to have said third frequency, F3, and a binary one (1) causes said FSK signal to have said fourth frequency, F4, and applying said F3 and F4 FSK signals to a related nonloaded loop;
receiving means for receiving said F1 and F2 FSK signals applied to said related nonloaded loop by said transmitting means of a related station modem and converting said F1 and F2 FSK signals into binary digital data form such that an F1 FSK signal causes a binary zero (0) and an F2 FSK signal causes a binary one (1) and applying said binary digital data to said bidirectional forwarding means; and,
a voice filter for connecting the other end of said nonloaded loop to said line switching equipment.

8. The improvement claimed in claim 7 wherein said transmitting means of the said subsystem modems includes a frequency synthesizer for producing said F3 and F4 FSK signals in accordance with the binary form digital data received from said bidirectional forwarding means and wherein said receiving means of said subsystem modems includes a frequency detector for detecting said F1 and F2 FSK signals and converting said F1 and F2 FSK signals into binary form digital data and applying said binary form digital data to said bidirectional forwarding means.

9. The improvement claimed in claim 8 wherein said bidirectional forwarding means comprises a multiplexer/demultiplexer for multiplexing the binary digital data produced by said receiving means of said subsystem modems and forwarding said multiplexed binary digital data to said data processing center and for receiving multiplexed binary digital data produced by said data processing center, demultiplexing said binary digital data produced by said data processing center and applying demultiplexed binary digital data to said transmitting means of said subsystem modems.

10. The improvement claimed in claim 7 wherein said bidirectional forwarding means comprises a multiplexer/demultiplexer for multiplexing the binary digital data produced by said receiving means of said subsystem modems and forwarding said multiplexed binary digital data to said data processing center and for receiving multiplexed binary digital data produced by said data processing center, demultiplexing said binary digital data produced by said data processing center and applying demultiplexed binary digital data to said transmitting means of said subsystem modems.

11. A data carrier system comprising:
(A) a plurality of pairs of nonloaded wires;
(B) a plurality of telephone stations, each of said telephone stations comprising:
  (1) a telephone;
  (2) a data terminal for producing and receiving digital data in binary form; and
  (3) station modem means connected between said data terminal and said telephone, and one of said pairs of nonloaded wires for:
    (a) converting digital data produced by said data terminal from binary form into FSK signal form such that a binary zero (0) causes said FSK signal to have a first frequency, F1, and a binary one (1) causes said FSK signal to have a second frequency, F2, and applying said F1 and F2 FSK signals to said one of said pairs of nonloaded wires; and,
    (b) converting digital data carried by said pair of nonloaded wires from FSK signal form into binary signal form such that an FSK signal at a third frequency, F3, causes a binary zero (0) and an FSK signal at a fourth frequency, F4, causes a binary one (1) and applying said binary digital data to said data terminal;
  (4) filtering means for connecting said telephone to said one of said pairs of nonloaded wires such that said telephone does not receive said F1, F2, F3 and F4 FSK signals;
(C) telephone switching equipment connected to the other end of said plurality of pairs of nonloaded wires, said telephone switching equipment including the switching equipment and a subsystem, said subsystem comprising:
  (1) subsystem modem means connected to the other ends of said pairs of nonloaded wires for:
    (a) converting said F1 and F2 digital data signals applied to said pairs of nonloaded wires by said station modem means from FSK signal form into binary form such that an FSK signal at said first frequency, F1, causes a binary zero (0) and an FSK signal at said second frequency, F2, causes a binary one (1); and,
    (b) converting binary digital data produced by a bidirectional forwarding means from binary form into FSK signal form such that a binary zero (0) causes said FSK signal to have said third frequency, F3, and a binary one (1) causes said FSK signal to have said fourth frequency, F4, and applying said F3 and F4 FSK signals to predetermined ones of said pairs of nonloaded wires;
  (2) filtering means for connecting said line switching equipment to said pairs of nonloaded wires such that said line switching equipment does not receive said F1, F2, F3 and F4 FSK signals; and,
  (3) bidirectional forwarding means for:
    (a) receiving binary digital data produced by said subsystem modem means, multiplexing said binary digital data and forwarding said binary digital data to a data processing center; and,
    (b) receiving binary digital data produced by said data processing center and applying said data processing center digital data to said subsystem modem means; and,
(D) a data processing center for receiving and processing binary digital data signals produced by said subsystem modem means; and, for producing binary digital data and forwarding said binary digital data to said bidirectional forwarding means of said subsystem.

12. The data carrier system claimed in claim 11 wherein said station modem means includes:
a transmitting means for converting binary digital data produced by said data terminal into FSK signal form such that a binary zero (0) causes said FSK signal to have said first frequency, F1, and a binary one (1) causes said FSK signal to have said second frequency, F2, and applying said F1 and F2 FSK signals to said pair of nonloaded wires; and,
receiving means for receiving said F3 and F4 FSK signals carried by said pair of nonloaded wires and converting said F3 and F4 FSK signals into binary digital data form such that an F3 FSK signal causes a binary zero (0) and an F4 FSK signal causes a binary one (1) and applying said binary digital data to said data terminal.

13. The data carrier system claimed in claim 12 wherein said transmitting means of the said station modem means includes a frequency synthesizer for producing said F1 and F2 FSK signals in accordance with the binary form digital data produced by said data terminal and wherein said receiving means of said station modems includes a frequency detector for detecting said F3 and F4 FSK signals and converting said F3 and F4 FSK signals into binary form digital data and applying said binary form digital data to said data terminal.

14. The data carrier system claimed in claim 13 including an automatic gain control circuit connected between said receiving means and said transmitting means of said station modems such that the amplitude of the F1 and F2 FSK signals produced by said frequency synthesizer of said transmitting means is controlled by the negative logarithm of the amplitude of the F3 and F4 FSK signals received by said receiving means.

15. The data carrier system claimed in claim 12 wherein said subsystem modem means includes a plurality of subsystem modems, each of said subsystem modems including:
a transmitting means for converting binary digital data received from said bidirectional forwarding means into FSK signal form such that a binary zero (0) causes said FSK signal to have said third frequency, F3, and a binary one (1) causes said FSK signal to have said fourth frequency, F4, and applying said F3 and F4 FSK signals to said pair of nonloaded wires; and,
receiving means for receiving said F1 and F2 FSK signals applied to said pair of nonloaded wires by said transmitting means of said station modem means and converting said F1 and F2 FSK signals into binary digital data form such that an F1 FSK signal causes a binary zero (0) and an F2 FSK signal causes a binary one (1) and applying said binary digital data to said bidirectional forwarding means.

16. The data carrier system claimed in claim 15 wherein:
said transmitting means of the said station modem means includes a frequency synthesizer for producing said F1 and F2 FSK signals in accordance with the binary form digital data produced by said data terminal and said receiving means of said station modem means includes a frequency detector for detectng said F3 and F4 FSK signals and converting said F3 and F4 FSK signals into binary form digital data and applying said binary form digital data to said data terminal; and, said transmitting means of the said subsystem modems includes a frequency synthesizer for producing said F3 and F4 FSK signals in accordance with the binary form digital data received from said bidirectional forwarding means and said receiving means of said subsystem modems includes a frequency detector for detecting said F1 and F2 FSK signals and converting said F1 and F2 FSK signals into binary form digital data and applying said binary form digital data to said bidirectional forwarding means.

17. The data carrier system claimed in claim 15 wherein said data processing center produces multiplexed binary digital data and wherein said bidirectional forwarding means comprises a multiplexer/demultiplexer for multiplexing the binary digital data produced by said receiving means of said subsystem modems and forwarding said multiplexed binary digital data to said data processing center and for receiving said multiplexed binary digital data produced by said data processing center, demultiplexing said binary digital data produced by said data processing center and applying demultiplexed binary digital data to said transmitting means of said subsystem modems.

* * * * *

UNITED STATES PATENT AND TRADEMARK OFFICE
CERTIFICATE OF CORRECTION

PATENT NO. : 4,302,629

DATED : November 24, 1981

INVENTOR(S) : John D. Foulkes et al.

It is certified that error appears in the above-identified patent and that said Letters Patent are hereby corrected as shown below:

Claim 1, column 10, line 14, "digial" is changed to --digital--

Claim 5, column 11, line 62, insert --FSK-- after "F4"

Claim 11, column 13, line 33, "the" is changed to --line--

Claim 16, column 14, line 68, "detectng" is changed to --detecting--

Signed and Sealed this

Seventh Day of December 1982

[SEAL]

Attest:

GERALD J. MOSSINGHOFF

Attesting Officer   Commissioner of Patents and Trademarks